United States Patent
Gapski (10) Patent No.: US 7,325,880 B2
(45) Date of Patent: Feb. 5, 2008

(54) DUAL DUMP BODY FOR TRUCK OR TRAILER

(75) Inventor: Daniel E. Gapski, Clay, NY (US)

(73) Assignee: Danco Products, Inc., Cicero, NY (US)

( * ) Notice: Subject to any disclaimer, the term of this patent is extended or adjusted under 35 U.S.C. 154(b) by 0 days.

(21) Appl. No.: 11/586,218

(22) Filed: Oct. 25, 2006

(65) Prior Publication Data

US 2007/0096536 A1    May 3, 2007

Related U.S. Application Data

(60) Provisional application No. 60/731,067, filed on Oct. 28, 2005.

(51) Int. Cl.
 *B60P 1/04* (2006.01)
(52) U.S. Cl. .................................. 298/17 R
(58) Field of Classification Search .............. 298/17 R
See application file for complete search history.

(56) References Cited

U.S. PATENT DOCUMENTS

| | | | |
|---|---|---|---|
| 273,202 A | 2/1883 | Wallace | |
| 666,186 A * | 1/1901 | Long et al. ................... | 296/51 |
| 674,320 A * | 5/1901 | Sebring ......................... | 296/51 |
| 797,900 A * | 8/1905 | Lowry .......................... | 296/51 |
| 815,454 A * | 3/1906 | Miller .......................... | 296/51 |
| 834,380 A * | 10/1906 | Hamilton ...................... | 296/51 |
| 1,445,215 A | 2/1923 | Holt, Jr. | |
| 1,972,042 A * | 8/1934 | Flowers ....................... | 105/273 |
| 3,120,823 A * | 2/1964 | Flowers ....................... | 105/273 |
| 3,323,838 A | 6/1967 | Trucco et al. .................. | 298/8 |
| 3,371,939 A | 3/1968 | Welk ............................ | 280/5 |
| 3,711,157 A | 1/1973 | Smock ......................... | 298/8 R |
| 3,720,336 A | 3/1973 | Murray et al. .............. | 214/505 |
| 3,841,234 A | 10/1974 | Nicoletti ..................... | 105/263 |
| 3,884,526 A | 5/1975 | Sweet et al. ................ | 298/1 A |
| 3,915,496 A | 10/1975 | Mabry, Jr. .................... | 298/14 |
| 4,109,809 A * | 8/1978 | Clark .......................... | 414/480 |
| 4,148,526 A | 4/1979 | Kurulek ....................... | 298/8 R |
| 4,666,211 A | 5/1987 | Smith et al. ................. | 298/8 R |
| 4,691,956 A * | 9/1987 | Hodge ......................... | 296/51 |
| 5,016,896 A * | 5/1991 | Shafer ......................... | 280/400 |
| 5,029,927 A * | 7/1991 | Totani ......................... | 296/50 |
| 5,059,085 A | 10/1991 | Koller ......................... | 414/482 |
| 5,362,195 A * | 11/1994 | Wagner ........................ | 414/483 |
| 5,685,594 A * | 11/1997 | Harper ........................ | 296/51 |
| 6,086,082 A * | 7/2000 | Andol ......................... | 280/414.1 |
| 6,371,564 B1 * | 4/2002 | Yates et al. .................. | 298/1 A |
| 6,814,396 B2 * | 11/2004 | Greer et al. ............... | 296/183.2 |
| 6,817,676 B2 * | 11/2004 | Anemone et al. ............. | 298/18 |

\* cited by examiner

*Primary Examiner*—H Gutman
(74) *Attorney, Agent, or Firm*—Bernhard P. Molldrem, Jr.

(57) ABSTRACT

A truck or trailer for hauling landscape materials or other bulk products, has separate independent side-by-side dump boxes or compartments, each with a hydraulic ram to elevate the respective dump box. The compartments may have segmented removable center walls, which can be taken off when the truck or trailer is used for hauling equipment or non-bulk loads.

10 Claims, 6 Drawing Sheets

DUAL DUMP BODY FOR TRUCK OR TRAILER

Applicant claims priority under 35 U.S.C. §119(e) of Provisional Application 60/731,067, filed Oct. 28, 2005, the disclosure of which is incorporated herein by reference.

BACKGROUND OF THE INVENTION

This invention relates to trucks and trailers used for hauling and delivering bulk materials, and is more particularly concerned with a truck body (or trailer body) in which there are two or more separate compartments that can be individually raised for dispensing the contents.

The invention is directed to a truck or trailer arrangement for hauling bulk products, such as bulk landscape materials, e.g., mulch, topsoil, stone, wood chips, compost, etc. When transported these materials have to be kept separate. The truck or trailer allows the materials to be delivered and dispensed on site by dumping from the truck body or trailer body, rather than having to be shoveled off. The invention involves having a pair of independent dumping compartments, each of which has its own hydraulic cylinder or other power lift mechanism.

In the procedure in current use, there is a single dump body on a truck or trailer, and where the customer needs two or more types of bulk landscaping materials, the driver usually has to make two or more trips, or else try to keep the two materials separated with a tarp or a plywood divider. Making two trips, each trip with only a half-load is very inefficient. The use of a divider does not prevent the two different bulk products from mixing and contaminating one another. Bulk products are more economical than the same product in packages or bags, but there has not been an efficient means for getting several types of material to the same site or two nearby sites, using a dump truck or dumping trailer.

OBJECTS AND SUMMARY OF THE INVENTION

Accordingly, it is an object of this invention to provide a trailer body or truck body arrangement for bulk product that increases its usefulness over the bulk product transport systems of the prior art.

It is another object to provide a dual or multiple dump body arrangement that can be installed simply and easily on a truck body or trailer.

It is a further object to a straightforward multiple dump arrangement that is configured for easily dumping the contents of the dump compartment, and which also provides for hauling tools and equipment.

A more particular object is to provide a dual dump compartment truck body or trailer body, in which center walls are removable so the truck or trailer body can be reconfigured for hauling equipment.

In accordance with an aspect of the present invention, a dual dump arrangement is configured for rear dumping, and there are a pair of side-by-side dump boxes. In one embodiment, for example, these may be ten-foot by three-foot independent dumping units or compartments. Each of these has an associated lift cylinder for raising the forward end for dumping. A hydraulic pump and reservoir are included on the trailer or truck body, and these are electrically powered, e.g., with a wire going to the truck battery, via a suitable connector, or from its own battery or from a power take-off on the truck.

In one preferred configuration, each of the dumping units has a straight vertical wall toward the centerline of the truck body, and has a broken wall at the outer side, i.e., straight at the top part and then tapered beneath that going to the floor of the compartment. There is then a triangular space along the outside beneath the tapered walls of the compartments, and these can be where the hydraulic pump and reservoir are located, and can also provide a space for storing other tools and equipment, such shovels, rakes, tamps, etc.

The two compartments can be located at the rear of a flat bed, truck or trailer, leaving a space towards the front that can be used for pallets of brick or other materials. Another alternative is to have a third, side-dumping compartment located ahead of the two rear-dump compartments. These configurations make it possible for the driver to carry sand, gravel, and pallets of brick to a site all on a single trip.

In another embodiment, the two dump compartments or dump boxes can each have straight walls, and the inner walls, i.e., the walls that extend along the center line of the truck or trailer, can be removed rather easily when it is desired to use the entire floor of the truck bed or trailer for hauling large items such as lawn mowers or other equipment, or for hauling non-bulk items such as bricks or timbers. In this case, the inner wall can comprise a series of sections each of which has downward protrusions that fit into stake sockets along the edge of the box floor. Optionally, the outer side walls could be similarly constructed so as to be removable.

Another possible embodiment is a small "home-owner" trailer for do-it-yourself projects, where a homeowner can rent or borrow the trailer, and use it to carry smaller amounts of the bulk materials, e.g., sand, loam, mulch or the like for a home project, with the trailer attaching to the customer's vehicle. In such case, an electrical actuator rather than hydraulic cylinders can be used to dump the two independent dump box units.

A number of different body styles can be used, all employing the same principle. These can include a large trailer, a small trailer, a pick-up truck insert, a large body truck dual dump, and a small body truck dual dump. The dual dump facility can be installed on other vehicles besides trucks and trailers, e.g., a boat or barge.

Instead of the hydraulic drive or ram that is used in the embodiments discussed here, an electromechanical mechanism could be used, such as a scissors lift. In either case, the operator can actuate the dumping mechanism from inside the cab or from alongside the truck or trailer, and does not need to stand behind the truck or trailer during a dumping operation.

The independent compartments are simple to fill by the supplier of the bulk materials, and the independent compartments keep the two (or more) types of bulk material segregated during transport and also when the materials are being dispensed at the job site. It is unnecessary to have a workman stand on the truck as it is not necessary to shovel out the material from the truck body.

The split dumping arrangement is bolted onto the truck body, and can be easily removed and installed on a different truck body.

Boards can be added to the top walls of the compartments to increase hauling capacity.

The side-by-side split dump arrangement of the described embodiments feature left and right boxes or compartments with independent hydraulic lifts. The boxes or compartments may have chamferred side walls so that bulk materials such as stone and mulch go towards the center of the truck and do not get caught in the box when being dumped out. In that case, the truck or trailer may also have storage compartments on the sides below the tapered walls. Preferably, the hydraulic pump arrangements run off the truck electrical system, using only a single power wire, so that the system is simple to install or remove. In one possible mode, the hydraulic lift system operates to lift only one side at a time, which must then be lowered before lifting the box on the other side. In another possible mode, both side boxes can be dumped simultaneously. The tail and brake lights are preferably situated on the side wall and back outside the tail gates, with a wiring harness concealed in the support rails, and these connect with the truck or tractor electrical harness using any traditional trailer connector.

The rear doors are configured so that they can be opened from the bottom end and pivot from their top end for dumping the bulk materials, or can be opened from the top and swung down pivoting from their bottom ends, for loading and unloading non-bulk materials or equipment. This is achieved with upper and lower sets of pivot latches.

The above and many other objects, features, and advantages of this invention will become apparent to persons skilled in the art from the ensuing description of a preferred embodiment, which is to be read in conjunction with the accompanying Drawing.

DETAILED DESCRIPTION OF THE PREFERRED EMBODIMENT(S)

Figure 1:
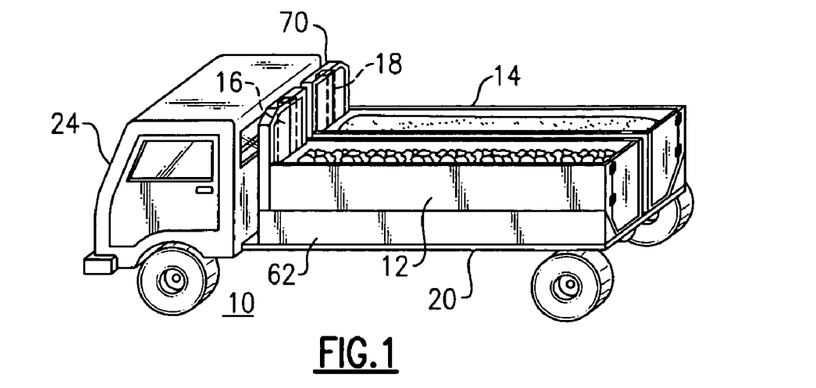
FIG. 1 is perspective view of one embodiment of a dual dump arrangement shown installed on a truck bed.
Figure 2:
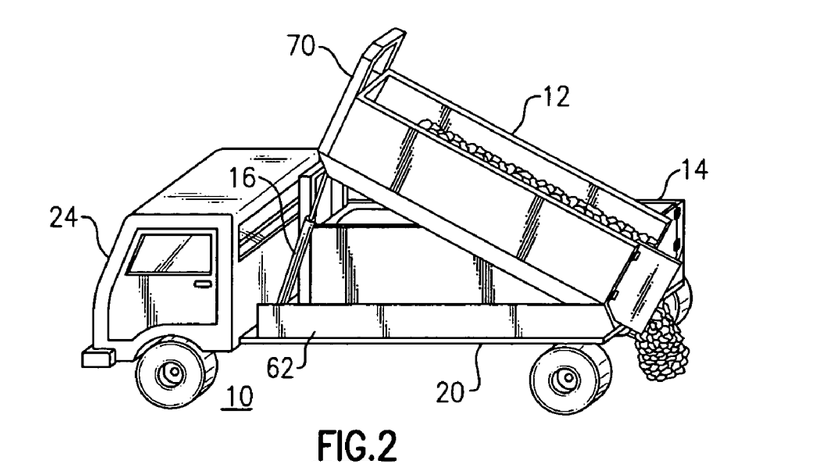
FIG. 2 is a perspective view of this embodiment, showing one side elevated for dumping bulk materials.

With reference to the Drawing, and initially to FIGS. 1 and 2, a split-dump body 10 according to one embodiment of the invention is formed with two side-by-side, independent compartments or boxes, namely a left box 12 and a right box 14, which are generally mirror images of one another. In this example, each of these may be nominally ten feet in length, and about three feed wide and two-and-one-half to three feet in depth. These are shown here carrying a load of bulk materials, e.g., top soil, stone, mulch, etc. There are respective right and left rams or hydraulic cylinders 16, 18 for raising the two boxes independently, as will be discussed.

The split-dump body 10 is here shown mounted on a flat bed or frame 20 of a truck. The cab 24 of the truck is shown to the left.

Figure 3:
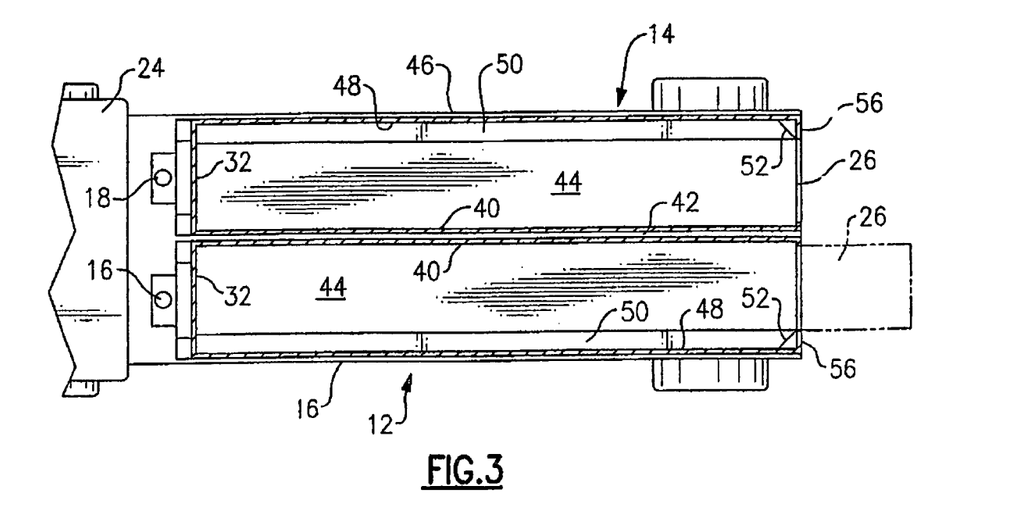
FIG. 3 is a top plan view of the arrangement of this embodiment.
Figure 4:
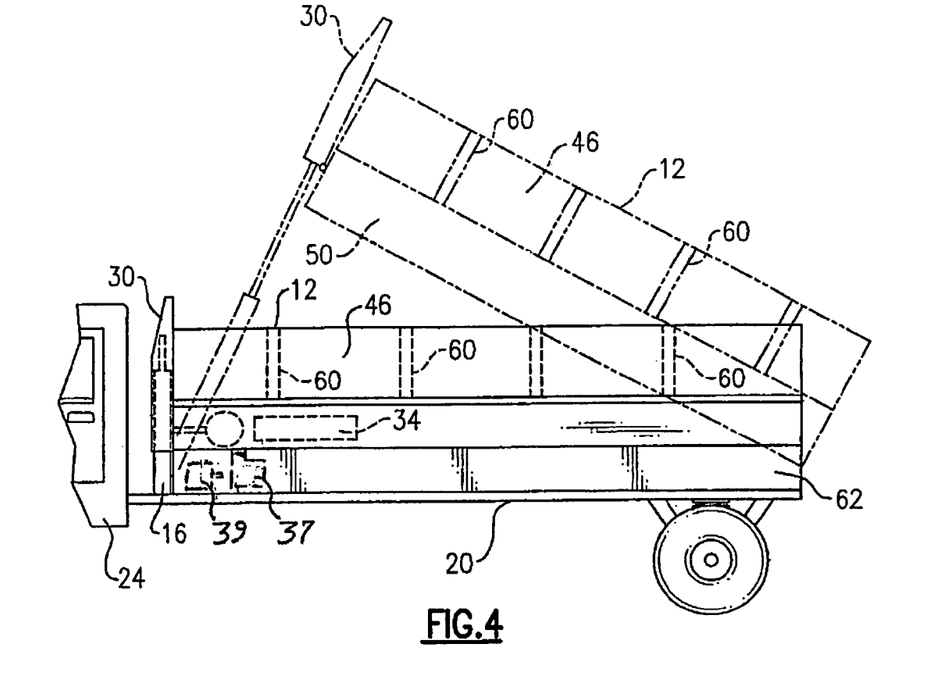
FIG. 4 is a side elevation of this embodiment, with one box shown in solid line in its lowered position and in broken line in its elevated position.
Figure 5:
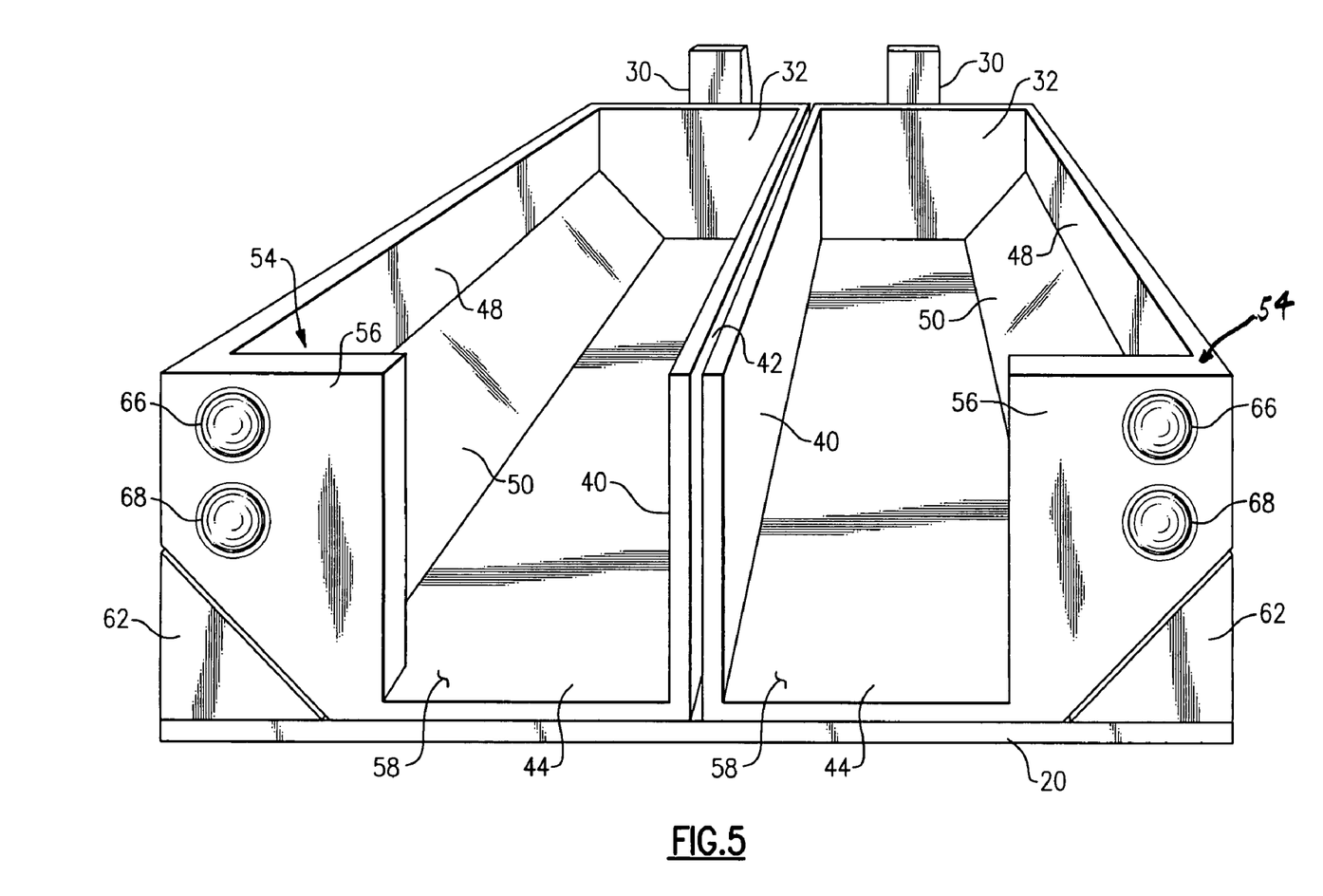
FIG. 5 is a rear perspective that shows details of the twin boxes or compartments of this embodiment.

Details of this embodiment are shown FIGS. 3, 4, and 5. Each of the rams 16, 18 has its cylinder mounted to the frame of the unit, and has a rod that extends upwards. Here, for each cylinder there is a tapered sleeve 30 that is pivotally mounted to the front wall 32 of the associated box 12 or 14, The sleeve is hinged to accommodate the angling of the box relative to the ram when the box is raised, as shown e.g., in FIG. 4.

Hydraulic equipment 34 associated with the rams 16, 18, that is, an electric pump for the hydraulic fluid and a hydraulic reservoir, are fitted into a triangular-profile space beneath a tapered outer wall of the box 12, 14. This equipment can include an interlock 37 with an override feature 39 so that only one box can be dumped at a time, and the box has to be lowered again before the other can be elevated. The interlock can be overridden in some embodiments, so that both boxes can be raised at one time.

The shape of the boxes of this embodiment can be explained with reference to FIGS. 4 and 5. The boxes 12, 14 each have a vertical inner wall 40 that extends back from the front wall 32. These walls 40, 40 extend along the centerline of the truck, and there is a space 42 of one to two inches between them. These walls 40 are welded to floor portions 44. An outside wall 46 in each box has a vertical upper portion 48 and a tapered portion 50 that angles down to the floor portion 44. There is an angled portion or wedge portion 52 at the very rear of each box where the outside wall 46 meets an associated rear wall 54 of the box 12 or 14. The wedge portion 52 prevents the contents from hanging up on the rear wall during dumping. The rear wall 54 has a generally pentagonal shaped outer part 56, and an inward open portion 58 which is normally closed off by the tail gate (omitted in FIG. 5).

Each of the boxes is hinged at the rear of the truck body so that it can be raised for emptying its contents at the job site.

As shown in FIG. 4, the side panels of the outside wall 46 have support rails 60 for strength.

A side compartment 62 with a generally triangular profile can be positioned on one side or both sides beneath the tapered wall 50 of the box 12 or 14. This provides space for storage of equipment items and tools. The hydraulic equipment 34, i.e., the hydraulic pump, reservoir, and valving, can be located here, as shown in FIG. 4. This compartment may be provided with swing-open doors, not shown in detail here. The hydraulic drive equipment is electrically powered from the battery or electrical system of the truck, and connects to the truck system for power using a single connector wire. Alternatively, there can be a hydraulic fluid pump powered from the truck engine, or compressed air may be used, if available. For smaller trailers, i.e., for self-help consumer type trailers, an electrical lift can be used instead of the hydraulic ram.

Instead of side-opening doors, there may be pin type hinge latches at top and also at bottom the doors, so that the door may open at the bottom for dumping gravel, rock, mulch, or other bulk material, or may be opened from the top to swing down for loading and unloading bags, articles, or equipment.

As also shown in FIG. 5, there are tail lamps including stop/turn signal lights 66 and reverse lights 68 positioned in the rear walls 54 of the split boxes 12, 14. There can also be side marker lamps, not shown, positioned along the side walls 48. The lamps and electrical fittings for these lights 66, 68 fit into the space created between the rear walls and the wedge members 52, and are wired through a wiring harness that is concealed within the rails 60. The wiring harness connects to the truck system through a standard connector or receptacle, which is also used for connecting to trailer lights.

Figure 6:
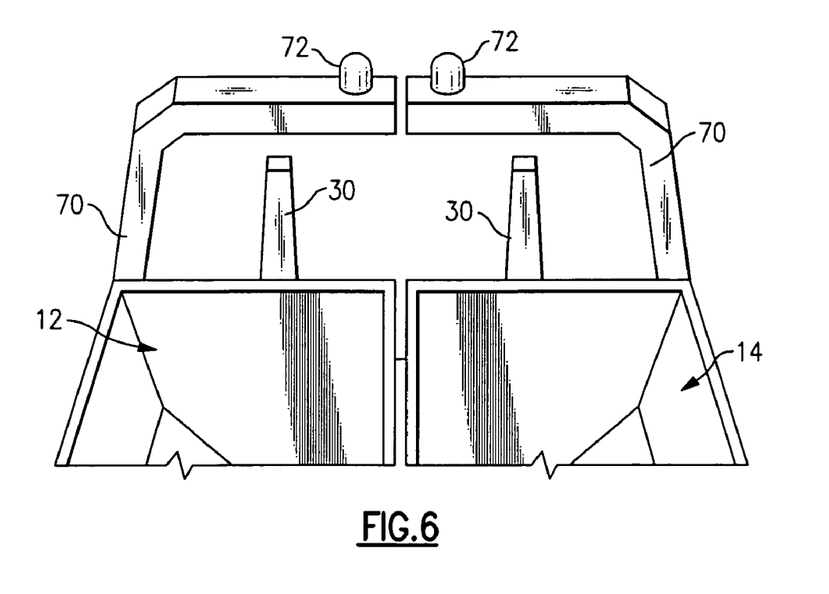
FIG. 6 is a rear perspective showing an auxiliary header bar employed over the hydraulic rams or other actuators.

FIG. 6 shows a header bar 70, or so-called headache bar, that extends up above the sleeves 30 of the hydraulic rams. Here the header 70 is attached onto the boxes 12, 14, and is split in the middle so that one side or the other will rise up when the box is elevated. The header protects the cab and the rams from the load sliding forward. As shown here, there may be a warning light 72, i.e., snow-plow light, mounted on one side or both sides of the header bar 70.

Figure 7:
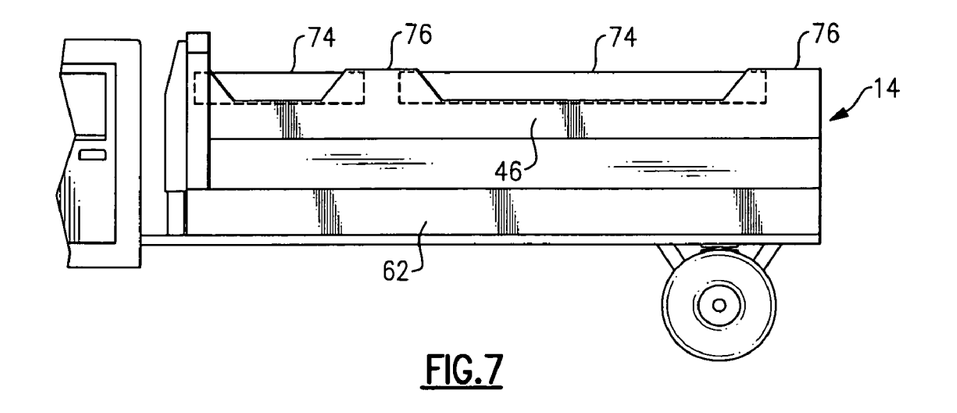
FIG. 7 is a side elevation showing an optional feature of side boards added to increase hauling capacity of the boxes or compartments.

As shown in FIG. 7, the top edges of the boxes 12, 14 may be provided with fittings for securing boards 74 at the top edges of the side walls. This will permit the boxes to extend up, for example, for an additional ten inches, to allow the boxes to carry additional volume of the bulk material. These may be present on both the outer and inner walls. As shown here, there may be steel or aluminum members 76 along the top edges, which help to secure the boards 74, but which remain in place when the boards are removed. These members 76 can also provide a location for the operator's company name or logo.

Figure 8:
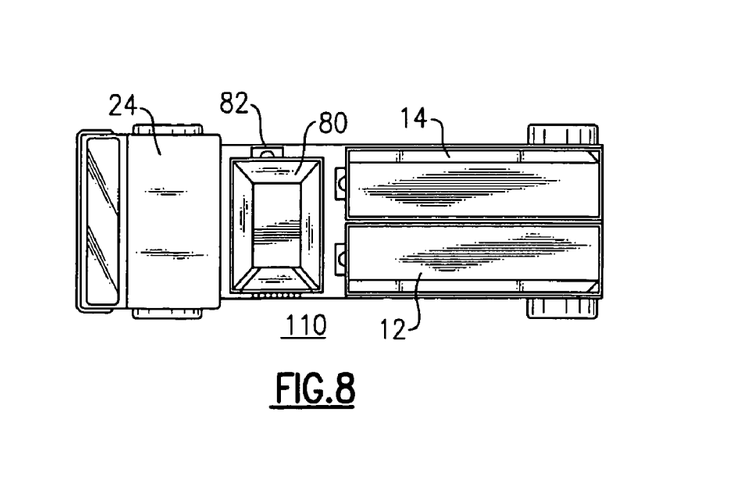
FIG. 8 is a top plan view showing an alternative embodiment.
Figure 9:
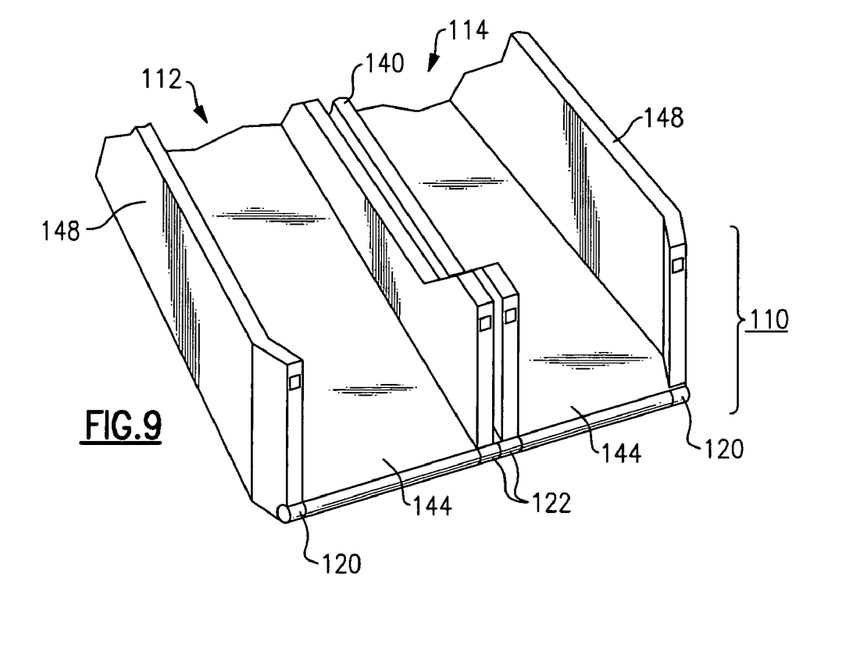
FIG. 9 is a partial perspective rear view of a truck or trailer body of another embodiment of the invention.
Figure 10:
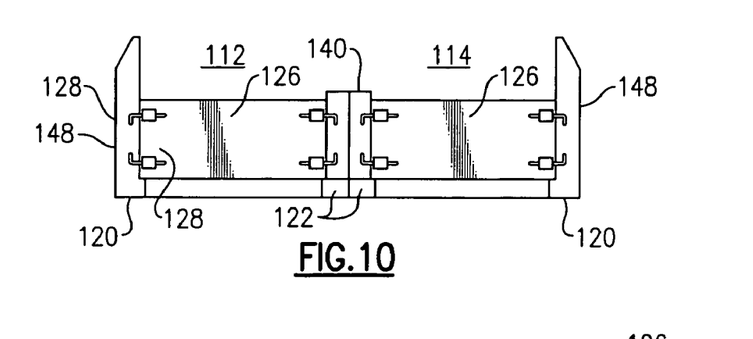
FIGS. 10 and 11 are rear views showing rear doors or gates.

FIG. 8 is a plan view of a possible alternative embodiment, in which a dump body 110 has a pair of elongated dump boxes 12, 14, as before, oriented in the longitudinal direction, but also has a third dump box 80, here arranged for side dumping. The side dumping box 80 is shown here with a hydraulic ram 82 on the right side of the truck, for lifting that side of the box so that the contents can be dispensed from the driver's side of the truck.

The split dump body of this invention provides complete segregation of the bulk materials, both in transport and on delivery, such that the bulk material in one box 12 can be delivered to one site by dumping from that box, and the bulk material in the second box 14 can be separately delivered to a second site by dumping only that box. The material can be dispensed by the driver or operator alone, without need to hand shovel any of the contents. With the split dump body, the operator can deliver two entirely different loads to two different sites without having to return to the supplier between loads, which cuts down on delivery time and on operating costs, such as fuel.

An embodiment of this invention which the truck or trailer body 110 is provided with square-corner boxes 112 and 114 and with removable center walls for the two boxes or compartments, is shown in FIGS. 9 to 15. The arrangement of this embodiment allows the center walls of the two boxes to be installed for hauling and delivering bulk materials, and can be removed to provide a single wide space for hauling lawn mowers, rollers, or other equipment. This arrangement can be quickly reconfigured one way or the other. Here, the similar elements to those found on the previously described embodiment are identified with similar reference numbers, but raised by 100. As in the previous embodiment, there are left and right independent dump compartments or boxes 112 and 114 each with an outer side wall 148 and each with a center wall 140 situated along the center line of the truck body. In this embodiment, the center walls 140, 140 of the two dump compartments 112, 114 are removable, as described shortly. Here, the side walls of the compartments are arranged vertically, and meet the floor 144 of the compartment at a right angle. The walls are without tapered portions, which increases the load capacity. At the rear, there are pivot brackets 120, 122 for each compartment and mounted to support members on its frame that fits onto the truck or trailer, so they may be pivoted at the rear of the truck or trailer body.

Figure 11:
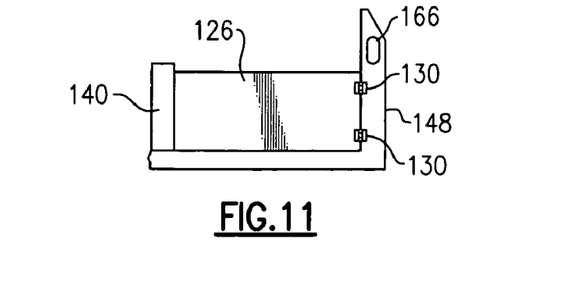
Figure 12:
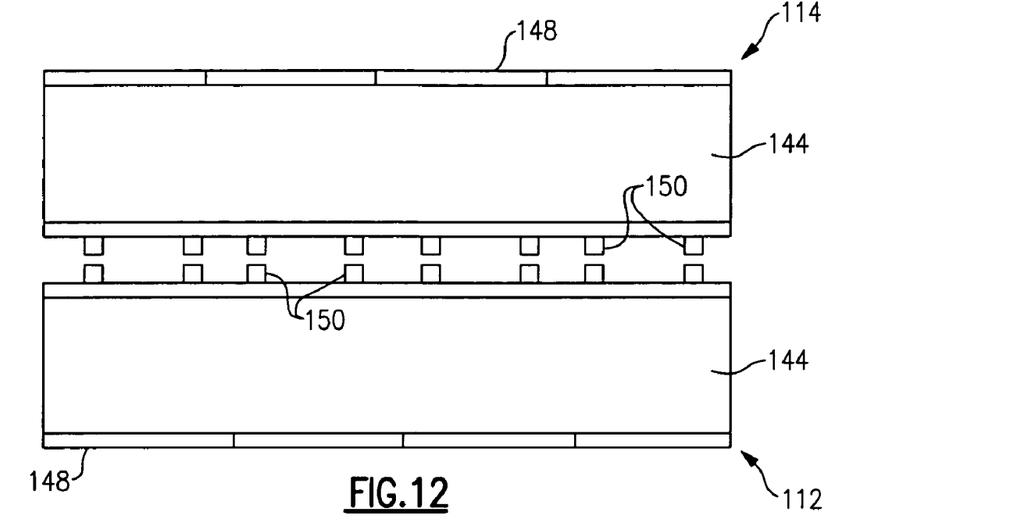
FIG. 12 is a top plan view of the truck or trailer body of this embodiment for explaining the provision for removable center walls.
Figure 13:
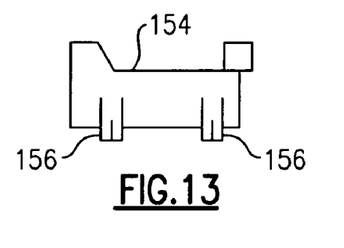
FIGS. 13 and 14 are side views of two of the modules of the removable center walls of this embodiment.
Figure 14:
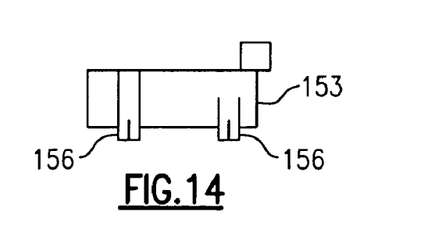

The rear doors 126 for each compartment may be provided with upper and lower pairs of pin-type hinge latches 128 so that each door may be either opened from the bottom to swing out on the upper pair of latches 128, or may be opened from the top, so the door may swing down on the lower pair of hinge latches to open. Alternatively, the doors 126 may be provided with side hinges 130 as shown in FIG. 11. Also, tail lights 166, as well as stop lights and turn indicator lights, may be positioned within the rear edges of the side walls 148 as shown here, with the wiring for them being concealed within the walls and other support structure.

While not shown here, there are independent hydraulic rams for lifting and lowering each compartment 112, 114 independently, similar to what has been discussed earlier.

Figure 15:
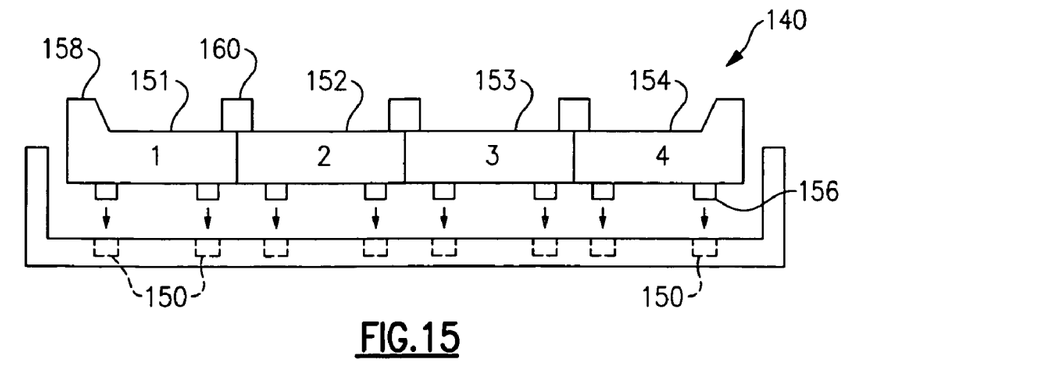
FIG. 15 is a side assembly view of this embodiment.

The removable center wall feature can be explained with FIGS. 12 to 15. As shown in plan in FIG. 12, each of the left and right compartments 112, 114 has an outer wall 148 along an outer edge of its floor 144, and has a series of square stake pockets 150 disposed along the other edge of the floor 144, i.e., along the center line of the truck body. Here there are four pairs of these stake pockets, with each pair having a spacing of 1 foot, 5⅜ inches and with the second stake pocket 150 of each pair being separated from the first pocket of the next pair by about 11⅜ inches. The removable center wall 140 for each compartment comprises a series of four wall segments 151, 152, 153, and 154, as shown in FIG. 15. Each of the stake pockets 150 accepts a male plug or post 156 that extends down from a respective one of the wall segments. There are two posts on each segment. The first and fourth wall segments 151 and 154 have a tapered fittings 158 for receiving the ends of boards when it is desired to raise the height of the wall 140. The second and third segments 152, 153, and the fourth segment 154 also have an intermediate support 160 at one end, which comprises a pair of square plates that support the board, when used. These segments are installed in the order shown, i.e., as marked "1", "2", "3", and "4", into the respective pairs of stake pockets 150 along the edge of the associated compartment. When the center walls 140 are in place, each compartment can be filled with a different type of bulk material and dumped out when delivered to one or more destinations. If it is desired to use the same truck or trailer for hauling a lawn mower or other equipment, then the wall segments 151 to 154 for each compartment 112, 114 can be easily pulled out. This provides a space of about six feet in width to accommodate any of a variety of equipment or palletized material.

While the invention has been described in detail with respect to a preferred embodiment, it should be recognized that there are many alternative embodiments that would become apparent to persons of skill in the art. Many modifications and variations are possible which would not depart from the scope and spirit of this invention, as defined in the appended claims.

I claim:

1. A split dump body adapted for carrying and dispensing landscaping material in bulk form, comprising first and second side-by-side dump boxes mounted on a truck or trailer, each of said boxes having side walls, a front wall, and a rear door; first and second rams for elevating a front end of the boxes, respectively, from a lowered position to a raised position; the boxes being pivoted at a rear end of the truck; and control equipment for the first and second rams for elevating one of the boxes while leaving the other in its lowered position; said control equipment including an interlock permitting only one of said rams at a time to elevate the front end of the associated box, and requiring such box to be lowered again before the other ram is able to elevate the front end of its associated box.

2. The split dump body of claim 1, wherein each of said boxes has an outer wall that is at least partly tapered towards a floor of the box.

3. The split dump body of claim 2, comprising a storage compartment beneath a tapered portion of the outer wall of one of said boxes.

4. The split dump body of claim 1, further comprising a side dump box positioned on the truck or trailer in advance of the first and second boxes.

5. The split dump body of claim 1, wherein said interlock includes an override that can be selectively actuated for permitting both rams to be actuated at the same time to lift both boxes.

6. A split dump body comprising first and second side-by-side dump boxes mounted on a truck or trailer; first and second rams for elevating a front end of the boxes, respectively, from a lowered position to a raised position; the boxes being pivoted at a rear end of the truck; and control equipment for the first and second rams for elevating one of the boxes while leaving the other in its lowered position, wherein each of said boxes has an inner wall along a mid line of the truck or trailer; and wherein each of said inner walls is removable such that the inner walls can be installed for hauling bulk materials and can be removed for hauling equipment or pallets.

7. The split dump body of claim 6, wherein each said inner wall is formed of a series of segments situated one behind the other along said mid-line.

8. The split dump body of claim 7, wherein a floor of each said box has a series of sockets along the mid-line of the truck or trailer for receiving mating protrusions of said segments forming the associated inner wall.

9. A split dump body adapted for carrying and dispensing landscaping materials in bulk form, comprising first and second side-by-side dump boxes mounted on a truck or trailer, first and second rants for elevating a front end of the boxes, respectively, from a lowered position to a raised position; the boxes being pivoted at a rear end of the truck; and control equipment for the first and second rams for elevating one of the boxes while leaving the other in its lowered position, said control equipment including an interlock permitting only one of said rams at a time to elevate the front end of its associated box, and requiring such box to be lowered before the other ram is able to elevate its associated box; wherein each of said boxes has a rear door; and said rear door has an upper set of releasable pivot latches at its top side and a lower set of releasable pivot latches at its bottom side, such that the door can be selectively opened at the bottom side and swung open from the upper pivot latches for dumping bulk materials or can be opened at the top side and swung down from the lower pivot latches for loading and removing equipment.

10. A split dump adapted for carrying and dispensing landscaping material in bulk form, comprising first and second side-by-side dump boxes mounted on a truck or trailer; first and second rams for elevating a front end of the boxes, respectively, from a lowered position to a raised position; the boxes being pivoted at a rear end of the truck; and control equipment for the first and second rams for elevating one of the boxes while leaving the other in its lowered position, said control equipment including an interlock permitting only one of said rams at a time to elevate the front end of its associated box, and requiring such box to be lowered before the other ram is able to elevate its associated box; wherein each of said boxes has a rear door; and said rear door has a set of hinges at one side mounted onto an outer wall of the associated box, such that the door opens by swinging out to the side.

* * * * *

UNITED STATES PATENT AND TRADEMARK OFFICE
CERTIFICATE OF CORRECTION

PATENT NO. : 7,325,880 B2  Page 1 of 1
APPLICATION NO. : 11/586218
DATED : February 5, 2008
INVENTOR(S) : Daniel E. Gapski It is certified that error appears in the above-identified patent and that said Letters Patent is hereby corrected as shown below:

Col. 8, Claim 9, line 4:  "rants" should read --rams--

Signed and Sealed this

Twentieth Day of May, 2008

JON W. DUDAS
*Director of the United States Patent and Trademark Office*